United States Patent [19]
Fujii et al.

[11] Patent Number: 6,128,263
[45] Date of Patent: Oct. 3, 2000

[54] EXTERNAL STORAGE DEVICE HAVING AN AUDIO FUNCTION, AND INFORMATION PROCESSING APPARATUS IN WHICH THE STORAGE DEVICE CAN BE INSTALLED

[75] Inventors: Kazuo Fujii, Yokohama; Yutaka Sawada, Machida; Takashi Sugawara, Yokohama, all of Japan

[73] Assignee: International Business Machines Corporation, Armonk, N.Y.

[21] Appl. No.: 09/133,045

[22] Filed: Aug. 12, 1998

[30] Foreign Application Priority Data

Sep. 3, 1997 [JP] Japan .................................... 9-237897

[51] Int. Cl.$^7$ ........................................................ G11B 3/90
[52] U.S. Cl. ........................................ 369/54; 369/124.11
[58] Field of Search .................................. 369/47, 48, 50, 369/53, 54, 58, 124.11, 32; 360/61, 67, 68

[56] References Cited

U.S. PATENT DOCUMENTS 5,420,839   5/1995   Tateishi ..................................... 369/32
5,602,687   2/1997   Tanaka et al. ............................ 360/61

FOREIGN PATENT DOCUMENTS 06243585A   9/1994   Japan ............................. G11B 20/10

Primary Examiner—Paul W. Huber
Attorney, Agent, or Firm—Douglas R. Millett

[57] ABSTRACT

The present invention provides a superior external storage device that can relay data concerning its mute state to an external apparatus, and a superior information processing apparatus that can be connected to such an external device.

The external storage device determines whether currently retrieved data from a storage medium are audio data or computer data, and notifies the information processing apparatus of the muted state when the retrieved data are computer data. The notification of the muted state may be performed by, for example, loading a mute signal to the motherboard of the information processing apparatus through an interface connector. As a result, the information processing apparatus can accurately identify the mute period of the external storage device, and accordingly, can precisely disable the sound function (e.g., an audio amplifier or a mixer in an audio controller) and switch it to the power saving state. In the information processing apparatus, upon the receipt of a mute signal, the line input line can be grounded and the generation of unwanted noise can be prevented.

13 Claims, 7 Drawing Sheets

EXTERNAL STORAGE DEVICE HAVING AN AUDIO FUNCTION, AND INFORMATION PROCESSING APPARATUS IN WHICH THE STORAGE DEVICE CAN BE INSTALLED

BACKGROUND OF THE INVENTION

1. Field of the Invention

The present invention relates to an external storage device being connected to an information processing apparatus such as a personal computer (PC), and to an information processing apparatus, and in particular to an external storage device, such as a CD-ROM drive, having an audio function and being connected to an information processing apparatus, and to an information processing apparatus. More specifically, the present invention pertains to an external storage device that provides a power saving function for an information processing apparatus that is connected thereto, and that has an improved S/N (Signal/Noise) ratio at the audio mute time, and to an information processing apparatus.

2. Description of Prior Art

In accordance with recent technological developments, various types of personal computers (PCS), such as desktops, towers and notebooks, have been produced and are being sold. The notebook PCS are so designed to be compact and light, while taking into account the portability and mobile, outdoor use.

One of the features of a notebook PC is that it is "battery operated" driven by an internally mounted battery. This feature is provided because the computer can thus be used in a mobile environment where commercial power source is not usually available. A battery used by a notebook PC is, in general, formed as a "battery pack," consisting of a plurality of rechargeable battery cells, such as Li-Ion, NiCd or NiMH battery cells. Although the battery pack is rechargeable, to recharge it 2 to 3 hours is required, whereas its operating capacity following each recharge is at most 2 to 3 hours. The long period of time required for charging is a fatal problem as far as the use of a battery-operated machine is concerned, and this is why a user is required to carry at least one extra battery pack. Therefore, in order to extend the operating period for batteries, various power saving technologies have been proposed for notebook PCS. The power saving function is another feature of notebook PCS.

Recently, because of ecological considerations, there has also arisen a demand for the incorporation of power saving features into desktop PCS that are usually installed in offices and are driven by seemingly endless, commercial power source. The Environmental Protection Agency (EPA) announced a self control program, called "Energy Star Computer Program," in June, 1993, requesting that the power consumed by a computer during a standby state shall be set to a predetermined standard level or less (a driving power of 30 w or less, or 30% or less when a CPU is in full operation mode). Computer makers, therefore, have competitively developed and manufactured products that satisfy the proposed standards.

The basic idea on which power saving designs for various electric/electronic apparatuses are based is the halting of the power supply to unused devices or circuits. In U.S. Pat. No. 4,933,785, for example, disclosed is a technology whereby the power supply to internal electric circuits within a hard disk drive (HDD) is halted step by step in accordance with its operational condition (i.e., the elapsed time since the last disk access) (see claim 45 in this publication).

On the other hand, expansion of multi-media functions has been rapidly advanced for the latest PC models. That is, functions by which not only computer data but also various data elements, such as motion pictures, still pictures, voice and character data, are decoded and processed in a computer system. Since so-called multi-media data are stored in huge files, such as files for color images, a multi-media PC is required to mount an external storage device, such as a CD-ROM drive or a DVD (Digital Video Disk or a Digital Versatile Disc), that can process an exchangeable storage medium storing a great quantity of data. Further, since the application of the multi-media function is being expanded to encompass the communication/broadcasting fields, such as for video conferences or for color facsimile communication, a device such as a modem or a LAN card should be installed in a computer for connection with a network. In addition, ZV (Zoom Video) standards that are compatible with a PC card slot have also appeared. A ZV port compatible PC card provides a fast motion picture display by transferring data directly to a video controller.

The sound function as well as the video function is indispensable to a multi-media PC because many of the peripheral devices associated with the multi-media function handle audio data as one type of multi-media data. The sound function of a PC is implemented in such a manner that an audio controller on a motherboard provides mixing/volume control and performs the D/A (digital/analog) conversion of audio signals that are output by individual peripheral devices, and that an audio amplifier amplifies the resultant signals and outputs the amplified signals through a loudspeaker (or outputs them across a line to an external audio device).

Let us return to the power saving design for the PCS. As previously described, the basic power saving design is the halting of the power supply to unused circuit modules. However, little consideration has been given to providing a power saving design for the sound function of the PC. This is because it is difficult to precisely detect an unused state (i.e., an audio signal muted state) for the sound function since there are many peripheral devices, such as a CD-ROM drive, a modem and a beep sound generator, that output audio signals.

Most of the audio controller chips mounted on the motherboard of a computer have a power saving function that can be set or canceled by software. In other words, a specific bit of an I/O register of an audio controller is defined as a "power control bit," and when certain software (e.g., a device driver for driving the audio controller) writes a flag "1" to the control bit, the system can fall into the low-power consumption state in which the operation of the audio controller is disabled.

However, if the sound function of the system (e.g., an audio CODEC chip or an audio amplifier) is mistakenly disabled while the CD-ROM drive is playing audio (CD-DA) data, the audio data retrieved from the disk can not be output. This occurs because even when the drive is returned from the muted state to the unmuted state, the computer may not recognize such a state transition and thus will not enable the sound function regardless of the activation of the drive. An external storage device, such as a CD-ROM drive, that also serves an audio function can play audio data not only upon a host command from the computer but also upon the depression of a play button provided on the drive unit. When the play button is depressed, it is impossible for the computer software to detect the mute/unmute state of the drive. If the normal operation of the sound function is expected, the sound function must be maintained active constantly. That is, the use of the power saving function of the audio controller is substantially impossible. For example, the audio amplifier in the active state constantly consumes several hundreds miliwatts of power, which for a battery-operated PC is too much to be ignored.

On the other hand, the muted state is defined for various audio products, including CD players. However, in their original forms audio processors are not external devices intended for connection to a computer system. That is, an audio product is a stand-alone machine that is not under the control of the computer system, and does not have a mechanism that can inform an external computer system of the muted state of the machine (i.e., an audio product is not connected to the computer system through an interface).

CD-ROM drives having an audio function have become popular. In Japanese Unexamined Patent Publication No. Hei 8-36829, for example, disclosed is a replaying apparatus for a CD (Compact Disk)—DA (Digital Audio) disk, which includes a mute circuit, and a video CD disk. However, the replaying apparatus merely incorporates a mute circuit that prevents the occurrence of unwanted and uncomfortable noise when a CD-ROM is mistakenly loaded and sound is replayed, and does not have a mechanism for notifying an external apparatus of the internal muted state. The replaying apparatus is a stand-along machine, and in its original state has no interface for a connection with an external computer system.

In Japanese Unexamined Patent Publication No. Hei 7-312014 is disclosed a CD audio/ROM player. The player has a host computer interface for the reading of computer data from a CD-ROM disk to an external computer system, or for the receipt of operating commands from the host computer. However, the mute function of the player merely prevents the release of noise though a loudspeaker connected to an audio terminal while the computer data are being retrieved, and a microcomputer processing retrieved data supplies a mute signal only to an internal audio circuit (for an example, see [0015] in the publication). In other words, a mute signal output by the microcomputer is used only inside the player, and is not output to the external apparatus. Accordingly, it is impossible for the external computer system on which the player is installed to identify the muted state of the player and perform a power saving operation.

If peripheral devices having an audio function notify the computer (i.e., a host) of their muted states, the host can precisely understand the period that the operation of the sound function is not necessary, and can save power on the sound function. However, as is described above, a CD-ROM drive, which is one of the multi-media devices, does not output externally a mute signal.

The audio signal input terminal of the computer is connected directly to the sound function, regardless of whether the peripheral devices are in the muted state. Therefore, an unwanted current flows along the audio signal line during the operation of the drive, which results in the deterioration of the S/N ratio.

PROBLEMS TO BE SOLVED BY THE INVENTION

It is one object of the present invention to provide a superior external storage device, such as a CD-ROM drive, that is connected to an information processing apparatus (e.g., a personal computer (PC)), and that has an audio function, and a superior information processing apparatus that can be connected to such an external device.

It is another object of the present invention to provide a superior external storage device that can relay data concerning its mute state to an external apparatus, and a superior information processing apparatus that can be connected to such an external device.

It is an additional object of the present invention to provide a superior information processing apparatus that can receive a mute signal from an external storage device that has an audio function.

It is a further object of the present invention to provide a superior information processing apparatus that ensures an improved S/N ratio in the muted state by employing a mute signal from an external storage device that has an audio function.

SUMMARY OF THE INVENTION

To achieve the above objects, according to a first aspect of the present invention, an external storage device having an audio function and being mounted in an information processing apparatus, comprises: a data retrieval unit for retrieving data from an internally loaded storage medium; a signal processor for processing the retrieved data; a determination unit for determining whether or not the retrieved data are audio data or computer data; an audio signal output unit for performing a DA conversion of the processed signal and outputting the resultant signal if the retrieved data are audio data; a computer signal output unit for decoding the processed signal and outputting the resultant signal if the retrieved data are computer data; an interface for connecting the computer signal output unit to the information processing apparatus; and a muted state notification unit for informing the information processing apparatus that retrieved data are mute data upon a determination that the retrieved data are not audio data.

According to a second aspect of the present invention, an external storage device having an audio function and being mounted in an information processing apparatus, comprises: a data retrieval unit for retrieving data from an internally loaded storage medium; a signal processor for processing the retrieved data; a determination unit for determining whether or not the retrieved data are audio data or computer data; an audio signal output unit for performing a DA conversion of the processed signal and outputting the resultant signal if the retrieved data are audio data; a computer signal output unit for decoding the processed signal and outputting the resultant signal if the retrieved data are computer data; an interface for connecting the computer signal output unit to the information processing apparatus; a muted state notification unit for informing the information processing apparatus that retrieved data are mute data upon a determination that the retrieved data are not audio data; and an output attenuator for attenuating the output of the audio signal output unit in response to the muted state.

According to a third aspect of the present invention, provided is an external storage device having an audio function and being mounted in an information processing apparatus that can retrieve data from either an audio data disk or a computer data disk, comprises: a data retrieval unit for retrieving data from an internally loaded disk; a determination unit for determining whether the loaded disk is an audio data disk or a computer data disk; an audio data processor for processing retrieved audio data; a D/A converter for performing a D/A conversion of the processed audio data; a line output driver for outputting through a line obtained analog audio data; a computer data processor for processing retrieved computer data; a decoder for decoding the processed computer data; an interface for exchanging the decoded computer data with the information processing apparatus; and a mute signal transmitter for transmitting a mute signal to the information processing apparatus upon a determination that an audio data disk is not loaded.

According to a fourth aspect of the present invention, provided is an external storage device having an audio function and being mounted in an information processing apparatus that can retrieve data from either an audio data disk or a computer data disk, comprises: a data retrieval unit for retrieving data from an internally loaded disk; a determination unit for determining whether the loaded disk is an audio data disk or a computer data disk; an audio data processor for processing retrieved audio data; a D/A converter for performing a D/A conversion of the processed audio data; a line output driver for outputting through a line obtained analog audio data; a computer data processor for processing retrieved computer data; a decoder for decoding the processed computer data; an interface for exchanging the decoded computer data with the information processing apparatus; a mute signal transmitter for transmitting a mute signal to the information processing apparatus upon a determination that an audio data disk is not loaded; and a line output attenuator for attenuating the line output of the line output driver upon a determination that an audio data disk is not loaded.

The external storage device according to the first to the fourth aspects may be a CD-ROM drive that can retrieve data from either a CD-DA (Digital Audio) disk or a CD-ROM disk, or a DVD drive that can access a DVD (Digital Versatile Disc).

According to a fifth aspect of the present invention, an information processing apparatus, in which an external storage device having an audio function can be installed, comprises: an interface connector used for an electric connection to the external storage device; a bus signal line, for computer data exchange, to be connected to the external storage device through the interface connector; an audio signal line along which an audio signal is received from the external storage device through the interface connector; and a mute signal line along which a mute signal is received from the external storage device through the interface connector.

According to a sixth aspect of the present invention, an information processing apparatus, in which an external storage device having an audio function can be installed, comprises: an interface connector used for an electric connection to the external storage device; a bus signal line, for computer data exchange, to be connected to the external storage device through the interface connector; an audio signal line along which an audio signal is received from the external storage device through the interface connector; a mute signal line along which a mute signal is received from the external storage device through the interface connector; and means for attenuating the received audio signal in response to a muted state of the mute signal line.

According to a seventh aspect of the present invention, an information processing apparatus, in which an external storage device having an audio function can be installed, comprises: a CPU for totally controlling the entire apparatus; a memory used to temporarily store data and a program to be executed by the CPU; a bus for interconnecting individual units in the apparatus; a bus interface for interconnecting the external storage device with the bus; an audio signal line along which an audio signal is received from the external storage device; a sound function unit for outputting the audio signal received along the audio signal line; and a mute signal line along which a mute signal is received from the external storage device.

According to an eighth aspect of the present invention, an information processing apparatus, in which an external storage device having an audio function can be installed, comprises: a CPU for totally controlling the entire apparatus; a memory used to temporarily store data and a program to be executed by the CPU; a bus for interconnecting individual units in the apparatus; a bus interface for interconnecting the external storage device with the bus; an audio signal line along which an audio signal is received from the external storage device; a sound function unit for outputting the audio signal received along the audio signal line; a mute signal line along which a mute signal is received from the external storage device; and a power saving controller for, at least while the mute signal line is in an unmuted state, keeping the sound function unit in an enabled state.

According to a ninth aspect of the present invention, an information processing apparatus, in which an external storage device having an audio function can be installed, comprises: a CPU for totally controlling the entire apparatus; a memory used to temporarily store data and a program to be executed by the CPU; a bus for interconnecting individual units in the apparatus; a bus interface for interconnecting the external storage device with the bus; an audio signal line along which an audio signal is received from the external storage device; a sound function unit for outputting the audio signal received along the audio signal line; a mute signal line along which a mute signal is received from the external storage device; and means for attenuating the received audio signal in response to a muted state of the mute signal line.

In the information processing apparatus according to the fifth to the ninth aspects, the external storage device may be a CD-ROM drive that can retrieve data from either a CD-DA (Digital Audio) disk or a CD-ROM disk, or a DVD drive that can access a DVD (Digital Versatile Disc).

An external storage device according to the first to the fourth aspects is a peripheral device (e.g., a CD-ROM drive) provided for an information processing apparatus, such as a personal computer.

The external storage device determines whether data currently retrieved from a loaded storage medium are audio data or computer data, and notifies the information processing apparatus of the muted state if the retrieved data are computer data. The notification of the muted state may be performed by, for example, transmitting a mute signal to the motherboard of the information processing apparatus through an interface connector. As a result, the information processing apparatus can accurately identify the mute period of the external storage device, and accordingly, can precisely disable the sound function (e.g., an audio amplifier or a mixer in an audio controller) and switch it to the power saving state.

The external storage device according to the second and the forth aspects attenuates the line output of the audio signal during the muted state. In this process, for example, the line output signal is grounded in response to the receipt of the mute signal. As a result, the information processing apparatus that receives the line output can prevent the generation of unwanted noise.

The information processing apparatus according to the fifth to the ninth aspects incorporates the external storage device according to the first to the fourth aspects, i.e., the external storage device that outputs a mute signal.

The information processing apparatus is connected to the external storage device by an audio signal line along which reproduced audio data are received, a bus signal line along which retrieved computer data are received, and a mute signal line. Therefore, the information processing apparatus can accurately identify the mute period of the external storage device, and accordingly, can precisely disable the sound function (e.g., an audio amplifier or a mixer in an audio controller) and move it to the power saving state.

The information processing apparatus according to the sixth and the ninth aspects attenuates the line input of the audio signal while the external storage device is in the muted state. In this process, for example, the line input signal is grounded in response to the receipt of the mute signal. As a result, the information processing apparatus that receives the line output can prevent the generation of unwanted noise.

Generally, since there is a distance between the external storage device, such as a CD-ROM drive, and an audio circuit on the motherboard of the computer, the ground level may differ between the drive unit and the motherboard. Even when the line output is grounded on the drive side, as in the second and the fourth aspects of the present invention, noise may be generated because of a potential difference between the two ground levels. When the external storage device is removed, the line input terminal of the computer is left in the open state. That is, noise may be generated due to a floating capacity at the end of the line input. On the other hand, according to the sixth and the ninth aspects, since the audio signal input is grounded within the computer when the external device is in the muted state, the generation of unwanted noise can be effectively prevented.

The other objects, features, and advantages of the present invention will become apparent in due course during the detailed description of the preferred embodiment of the present invention, which will be given while referring to the accompanying drawings.

DESCRIPTION OF THE PREFERRED EMBODIMENT

Figure 1:
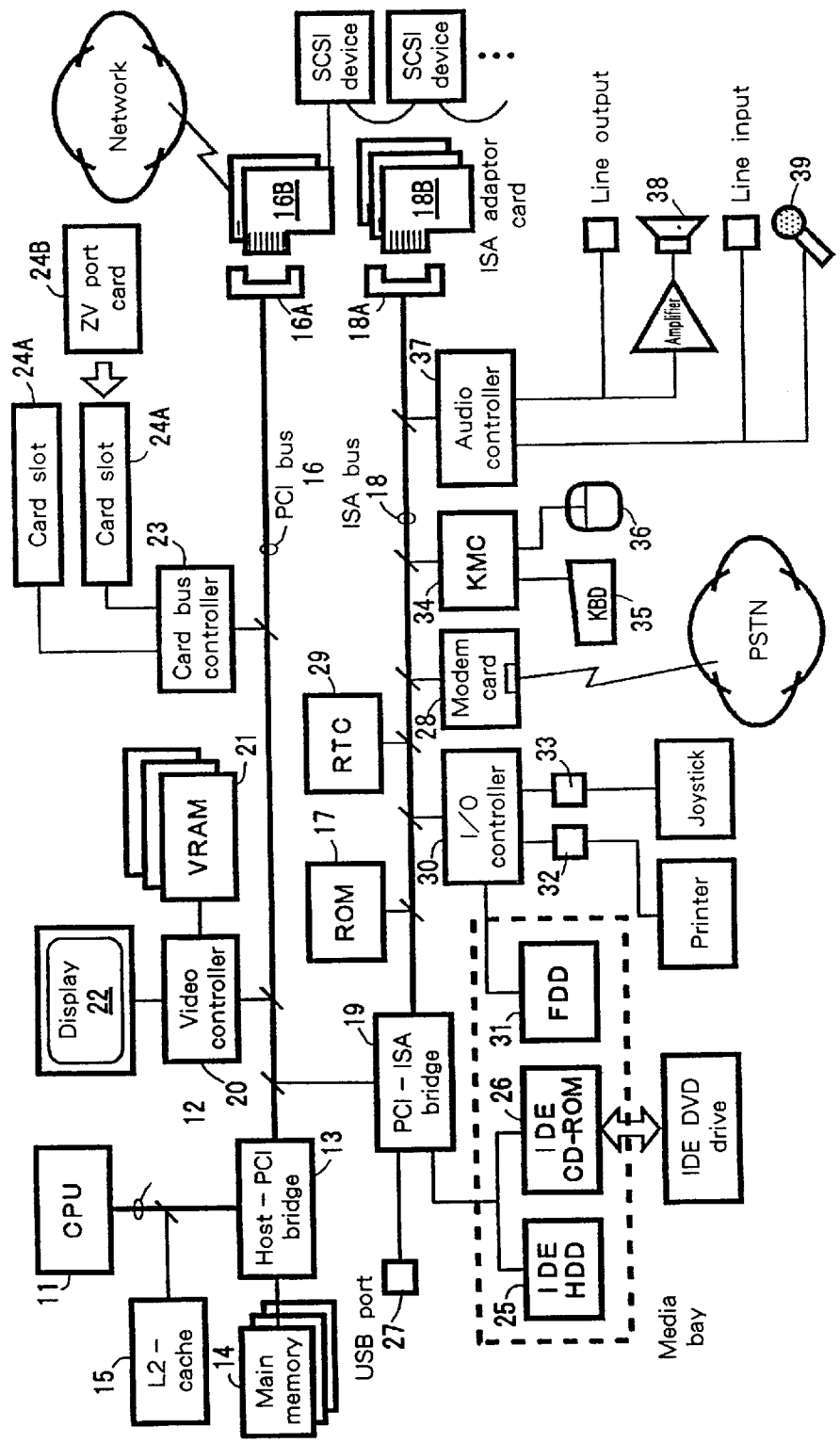
FIG. 1 is a schematic diagram showing the hardware arrangement for a typical personal computer (PC) 100 according to the present invention.

The preferred embodiment of the present invention will now be described while referring to the drawings.

A. Hardware arrangement of a computer connected to an external storage device

FIG. 1 is a schematic diagram illustrating the hardware arrangement of a typical personal computer (PC) 100 embodying the present invention. This example PC conforms to the OADG (PC Open Architecture Developer's Group) specifications, and incorporates an operating system (OS), such as "Windows95" from Microsoft Corp., or "OS/2" from IBM Corp. The individual sections will now be described.

A CPU 11, a main controller, executes various programs under the control of the OS. The CPU 11 is, for example, a CPU chip "Pentium" or "MMX technology Pentium" from Intel Corp.

The CPU 11 is interconnected to individual hardware blocks (which will be described later) through three buses: a processor bus 12 directly connected to its external pins; a PCI (Peripheral Component Interconnect) bus 16 serving as a local bus; and an ISA (Industry Standard Architecture) bus 18 serving as a system bus.

The processor bus 12 communicates with the PCI bus 16 through a bridge circuit (host-PCI bridge) 13. The bridge circuit 13 in this embodiment includes a memory controller for controlling the access of the main memory 14, or a data buffer for absorbing the difference of the data transfer speed between the buses 12 and 16.

The main memory 14 is volatile memory, and is used as a writing area for a program executed by the CPU 11 or as a work area for the program. Generally, the main memory 14 consists of a plurality of DRAM (Dynamic RAM) chips. A memory capacity of, for example, 32 MB is provided as a standard and can be expanded to 256 MB. The programs to be executed include, Windows95 or another OS, respective device drivers for operating peripheral devices, and various application programs.

An L2-cache 15 is high-speed memory for absorbing the time required the CPU 11 to access the main memory 14. A very limited amount of code and data that the CPU 11 frequently accesses are temporarily stored in the L2-cache 15. Generally, the L2-cache 15 consists of SRAM (Static RAM) chips, and its memory capacity is, for example, 512 KB.

The PCI bus 16 is a bus for relatively fast data transfers (a bus width of 32/64 bits, a maximum operating frequency of 33/66 MHz and a maximum data transfer speed of 132/264 MBps). PCI devices, such as a video controller 20 and a card bus controller 23, that are operated at relatively high speeds are connected to the PCI bus 16. The PCI architecture was originated and advocated by Intel Corp., and implements the PnP (Plug-andPlay) function.

A video controller 20 is a dedicated controller for the actual processing of graphics commands received from the CPU 11. The processed graphics information is temporarily written in a screen buffer (VRAM) 21, and then is read from the VRAM 21 and output as display data to an LCD (liquid crystal display) or a CRT (Cathode Ray Tube) display 22.

A card bus controller 23 is a dedicated controller for transmitting a bus signal on the PCI bus 16 directly to an interface connector (card bus) of a PC card slot 24A. A PC card 24B, which conforms to the standards (e.g., "PC Card Standard 95") drafted by PCMCIA (Personal Computer Memory Card International Association) and JEIDA (Japan Electronic Industry Development Association), can be inserted into the PC card slot 24A. The PC card 24B may be a LAN card for network connection, an HDD card serving as an external memory device, or a SCSI (Small Computer System Interface) card for externally connecting various types of SCSI devices. Recently, a PC card for a ZV (Zoom Video) port has appeared. The ZV port PC card enables a fast motion picture display by the direct data transfer to the video controller 20 (previously described).

The PCI bus 16 and the ISA bus 18 are mutually connected by a bridge circuit (PCI-ISA bridge) 19. The bridge circuit 19 in this embodiment includes a DMA controller, a programmable interrupt controller (PIC) and a programmable interval timer (PIT). The DMA controller is a dedicated controller for performing data transfers between peripheral devices (e.g., the FDD) and the main memory 14 without the involvement of the CPU 11. The PIC is a dedicated controller for executing a predetermined program (an interrupt handler) in response to the occurrence of an interrupt request (IRQ) from the peripheral devices. The PIT is a device for generating a timer signal (normally a rectangular wave signal) in a predetermined cycle. The generation of the cycle is programmable.

The bridge circuit 19 in this embodiment also has an IDE (Integrated Drive Electronics) interface for connecting an external storage device that conforms to the IDE specifications. Not only an IDE hard disk drive (HDD) 25, but also an IDE CD-ROM drive 26 which conforms to an ATAPI (At Attachment Packet Interface is connected to the IDE interface. Instead of the IDE CD-ROM drive 26, another type of IDE device, such as a DVD (Digital Video Disc or a Digital Versatile Disc) drive may be connected. External storage devices, such as the HDD 25 and the CD-ROM drive 26, are accommodated into a room called a "media bay" or a "device bay" in the system 100. These external storage devices equipped as standard may be so provided that they are exchangeable with an FDD or a battery pack (for a notebook computer) and exclusive from the others.

The HDD 25 is superior in access speed to other external storage devices. When a software program (an OS, application software, etc.) is copied to the HDD 25 (i.e., installed in the system), the software program is prepared for execution by the system 100. The CD-ROM driver 26 can perform both the replay of music CD data (CD-DA data) and the retrieval of computer data (CD-ROM data). A computer program installed in the system 100 may be supplied as a CD. A DVD drive, into which is loaded a DVD one type of optical disk, may be a read-only DVD-ROM drive or a random access DVD-RAM drive. The data transfer speed of the DVD drive is equivalent to a 10×CD-ROM drive. The DVD is a storage medium on which various data, such as video data, can be recorded, and on one side has a memory capacity of 4.7 GB (equivalent to 133 minutes of filming). During operations other than the replay of music data, the CD-ROM drive 26 and the DVD drive stay in the muted state, which will be described later.

The bridge circuit 19 in this embodiment includes a USB (Universal Serial Bus) route controller for connecting a general purpose USB and a USB port 27. The USB supports a hot plugging function that permits the removal and insertion of a new peripheral device (a USB device) while the apparatus is powered on, and a plug-and-play function for automatically identifying a newly connected peripheral device and reconfiguring the system configuration. A maximum of 63 USB devices can be connected to a single USB port in a daisy chain manner. The USB devices are, for example, a keyboard, a mouse, a joystick, a scanner, a printer, a modem, a display monitor and a tablet.

The ISA bus 18 is a bus along which the data transfer speed is lower (a bus width of 16 bits and a maximum data transfer speed of 4 MBps) than it is for the PCI bus 16. The ISA bus 18 is used to connect peripheral devices, such as a ROM 17, a modem card 28, a real time clock (RTC) 29, an I/O controller 30, a keyboard/mouse controller (KMC) 34 and an audio controller 37, that are driven at relatively low speeds.

The ROM 17 is nonvolatile memory for the permanent storage of a code group (BIOS: Basic Input/Output System) for managing the input and output operation by hardware components such as the keyboard 35 and a floppy disk drive (FDD) 31, and a test program (POST: Power On Self Test) that is executed when the system 100 is first powered on.

The modem card 28 is a device for transmitting digital computer data across an analog public switched telephone network (PSTN). The modem card 28 includes circuit components, such as a signal processor (a modem chip) for modulating transmitted data and demodulating received data, and a data access arrangement circuit (DAA) for connecting a modem to a public switched telephone network in accordance with the line switch standards of each country. In the off-hook state (i.e., during the communication process) the modem card 28 is in the unmuted state, while in the on-hook state, the modem card 28 is in the muted state.

The real time clock (RTC) 29 is a device for measuring the current time. Generally, the RTC 29 and a CMOS memory (not shown) are mounted together on a single chip. The CMOS memory is used to store information, such as system configuration information (a BIOS setup value) and a power ON password, that is required for the security/safety of the system 100. The RTC/CMOS 29 is backed up by a reserve battery (ordinarily a coin battery, not shown) so that the contents obtained by measurement and the stored data are not lost even when the system 100 is powered off.

The I/O controller 30 is a peripheral controller for driving the floppy disk drive (FDD) 31, and controlling the input/output of parallel data through a parallel port 32 (PIO) and the input/output of serial data through a serial port 33 (SIO). A printer, for example, is connected to the parallel port 32, and a joystick is connected to the serial port 33.

The keyboard/mouse controller (KMC) 34 is a peripheral controller for fetching, as computer data, scan code input through a keyboard 35, or coordinate values designated by a pointing device 36 (a mouse or a TrackPoint).

The audio controller 37 is a dedicated controller for processing the input/output of audio signals, and includes a CODEC circuit (COder-DECoder: A/D and D/A converters having a mixing function) for recording and replaying digital audio signals. The audio signals are received, for example, as voice through a microphone 39, or as line input from an external audio device (not shown). The generated audio signal is output along the line to an external audio device (not shown), or is amplified by an audio amplifier and the resultant signal is output through a loudspeaker 38. The audio controller 37 may conform to standard specifications "AC (Audio Codec) '97" drafted by Analog Device, Inc., Creative Labs, Inc., Intel Corp., National Semiconductor Corp. and Yamaha Corp.

One or more PCI bus slots 16A or ISA bus slots 18A are provided at one end of the bus 16 or the bus 18. These bus slots 16A and 18A are exposed externally at one part of the wall surface of the computer 100 (although the bus slots 16A and 18A may be provided by a docking workstation for a notebook PC, no further explanation for the docking workstation will be given). PCI adaptor cards 16B and ISA adaptor cards 18B can be inserted into the bus slots 16A and 18A, respectively. One example of the PCI adaptor card 16B is a LAN card for connection of the computer 100 to a network, and another example is a SCSI (Small Computer System Interface) card for external connection of a SCSI device, such as an HDD, a CD-ROM drive, a DVD drive or a printer.

A typical user of the personal computer 100 manipulates the system 100 by using the keyboard 35 or the mouse 36. The system 100 executes various application programs, such as word processing, spreadsheet and communication, in order to accomplish user's job.

A so-called personal computer currently available on the market fully satisfies the hardware configuration that will serve as the system 100 in FIG. 1. Although many electric circuits other than those shown in FIG. 1 are required to construct the system 100, they are well known to one having ordinary skill in the art. And as they are not directly related to the subject of the present invention, no explanation for them will be given. Further, it should be noted that, to avoid making the drawings too complex, only one part of the connections between the hardware components is shown in FIG. 1.

B. Hardware arrangement of an external storage device

A detailed explanation will now be given for the hardware arrangement of an external storage device connected to the personal computer 100 and that retrieves data from a storage medium and supplies the data to the computer 100. The external storage device retrieves audio data and computer data from a storage medium loaded into the device, and supplies audio data as a line input signal, or computer data as a bus signal, to the personal computer 100. In addition, as required, the external storage device outputs a mute signal to the personal computer 100. The mute signal line enters the unmuted state (low level) when audio data are being retrieved, and switches to the muted state (high level) in all the other cases.

Figure 2:
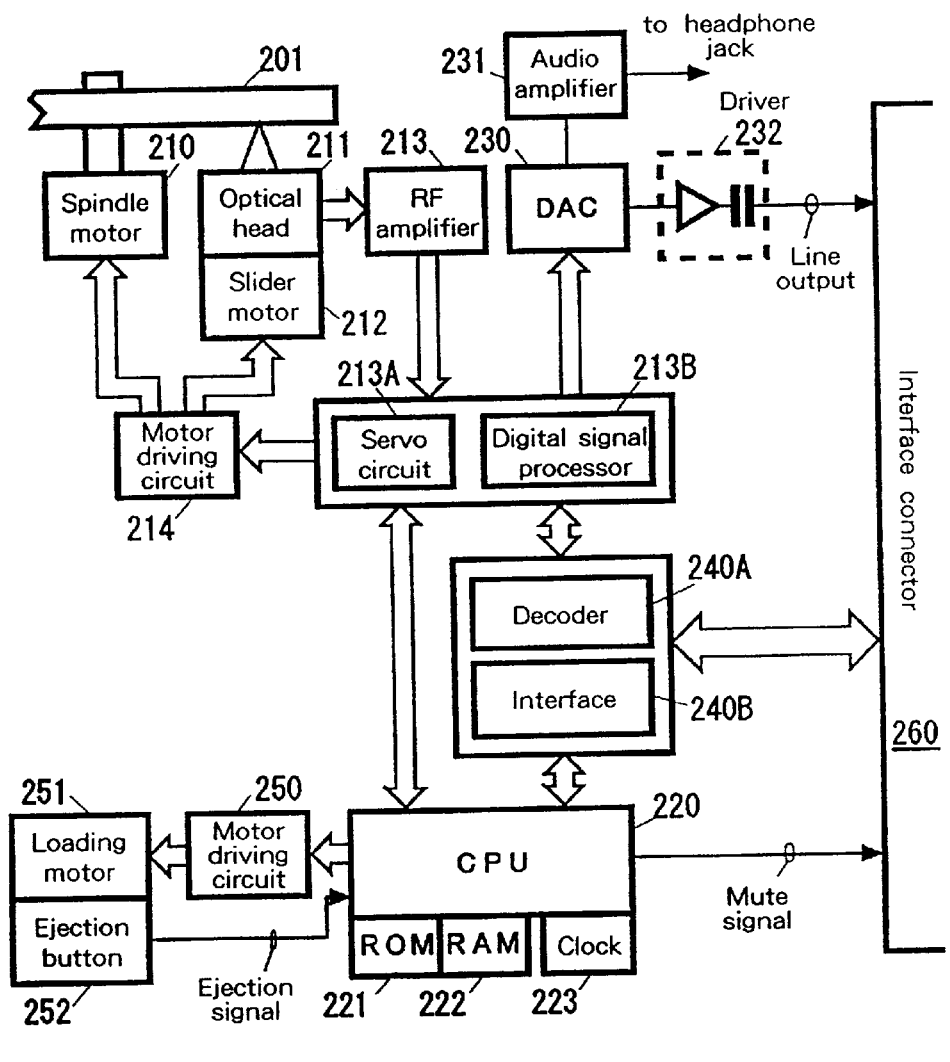
FIG. 2 is a diagram illustrating the internal hardware arrangement of a CD-ROM drive 200 (first embodiment).

An example of an external storage device is a CD-ROM drive. The CD-ROM drive may be either an IDE CD-ROM drive 26 shown in FIG. 1 or a SCSI CD-ROM drive connected through a SCSI card. FIG. 2 is a diagram illustrating the internal hardware arrangement of a CD-ROM drive 200 (a first embodiment). The individual sections will now be described.

A compact disk (CD) 201 is rotatably loaded on a spindle motor 210. A CD 201 is a storage medium on which data are stored by forming digital data bits (convex and concave shapes having different reflection indexes) on one side of a disk made of transparent resin. Very thin metal film of aluminum is deposited on the surface and a hard protection film is formed thereon. Data are recorded (i.e., bits are formed) on the disk 201 radially and with an equal density from the center to the external circumference. The CD-ROM drive 200 scans tracks on the disk 201 using a laser beam, and employs changes in the intensity of the reflection for the retrieval of data, which will be described later.

The physical and logical CD specifications are described in detail in the International Standards Organization "Red Book," "Yellow Book" and "Green Book" standards, which were drafted mainly by Sony Corp. and Phillips Inc. The physical format is roughly divided into three areas, from the internal circumference of a disk: a Lead In area, a program area and a Lead Out area.

The Lead In area and the Lead Out area are used to store disk attribute data and various control data, such as start positions for individual tracks. A table called a "TOC (Table Of Contents)" is provided in the Lead In area. The TOC has one Q channel for each track for managing the attribute and control data of the corresponding track on the disk.

The program area is used to store the user data, such as audio data and computer data, and consists of one or more tracks. The track/format for storing computer data is called a "CD-ROM" track/format, and a track/format for storing audio data is called a "CD-DA (Digital Audio)" track/format. There is also a hybrid type track/format where a CD-ROM track and a CD-DA track coexist on a single disk. In addition, there are "CD-Graphics" where image data are recorded on an empty audio data area, and "CD-I (Interactive media)" and "CD-ROM XA" on which image data and audio data are interleaved (multiplexed in the time-division manner) on the same track.

A tray (not shown) on which the disk 201 is exchangeably loaded is coupled with a loading motor 251 so as to permit the insertion and ejection of the disk 201. An ejection button 252, which is generally provided on the front bezel of the CD-ROM drive 200, is a control button for instructing the insertion/ejection of the tray. When the depression of the button 252 is detected, the event is transmitted to a CPU 220 (to be described later) through an ejection signal line. In response to an instruction from the CPU 220, a motor driver 250 drives the loading motor 251.

An optical head (Pick-Up-Head) 211 is provided beneath the bottom surface of the disk 201. The optical head 211 irradiates the disk 201 with a laser beam and collects the reflection. The optical head 211 is mounted on a slider motor 212 that can be moved in the radial direction of the disk 201. A motor driving circuit 214 controls the revolutions of the spindle motor 210 and the sliding motor 212, so that the optical head 211 scans the tracks of the disk 201 at a constant linear velocity (CLV).

A signal from the optical head 211 is transmitted to an RF amplifier 213 for controlling the position of the optical head 211 and for the retrieval of data stored on the disk 201. A closed loop control system, which is formed by a servo circuit 213A and the motor driving circuit 214, synchronously drives the spindle motor 210 and the slider motor 212 in accordance with the signal output by the optical head 211, and enables the optical head 211 to scan a predetermined location on the disk 201. The optical head 211 is supported by a dual-axes device (not shown) that can be moved slightly, and that can compensate for focusing and tracking.

The signal from the optical head 211 is processed by a digital signal processor 213B for the retrieval of data. In this embodiment, the digital signal processor 213B and the servo circuit 213A are constructed on the same chip.

The CPU 220, which will be described later, determines whether or not a retrieved signal is audio (CD-DA) data or computer (CD-ROM) data. This determination process may be performed by one of following methods: (1) determining whether or not demodulated binary data can be interpreted as computer data; (2) referring to a control bit for a corresponding Q channel in the TOC (see Japanese Unexamined Patent Publication No. Hei 8-36829 or No. Hei 4-315874); or (3) referring to a sync signal prepared for each frame on a disk (see Japanese Unexamined Patent Publication No. Hei 3-12014), or by employing a method other than the above described methods. The determination process can be implemented by the execution of the CPU 220 of firmware stored in a ROM 221, which will be described later.

When data retrieved from the disk 201 are audio data, a digital audio signal is converted into an analog signal by a digital/analog converter (DAC) 230. The level of the analog audio signal output by the DAC 230 is changed by a driver 232, and the resultant analog signal is output to the computer 100 (the audio controller 37 on the motherboard) across a line through an interface connector 260, or is amplified by an audio amplifier 231 in the drive unit 200 and the resultant signal is externally output through a headphone jack.

If audio data are retrieved from the disk 201, a mute signal at a low level is transmitted by the CPU 220 through the interface connector 260 in order to notify the computer 100 of the "unmuted" state of the drive 200.

When data retrieved from the disk 201 are computer data, they are decoded by a decoder 240A and the decoded data are transmitted to the computer 100 by an interface 240B. The interface 240B includes I/O registers, including a data register, an address register, a control register and a status register, and is interconnected with the bus 16/18 on the motherboard through the interface connector 260. The protocol for interfacing with the bus 16/18 may conform to IDE, SCSI or other standards. In other words, there is no limitation placed on the interfaces used to embody the present invention. In this embodiment, the decoder 240A and the interface 240B are constructed on the same chip.

When the data retrieved from the disk 201 are computer data (or are not audio data), the CPU 220 transmits a high level mute signal through the interface connector 260 in order to notify the computer 100 of the "muted" state.

The CPU 220 is a main controller for controlling the internal operation of the CD-ROM drive 220. More specifically, the CPU 220 employs a signal from the ejection button 252 to insert or eject the tray. In addition, the CPU 220 receives a host command from the computer 100 through the interface 240B, and retrieves data from the disk 201.

A ROM 221, a RAM 222 and a clock 223 are provided for the CPU 220. In the ROM 221 permanently stores firmware to implement operations, such as a self diagnosis upon power-on reset, interpretation of a host command, confirmation of the status in the drive 200 and mechanical control. The RAM 222 is a volatile memory for storing work data used by the CPU 220, and also storing the TOC, drive parameters (a data transfer speed, etc.) and audio parameters (a sound output level, etc.). The clock 223 is a device for generating a sync signal to acquire the operational timing.

The CD-ROM drive 200 transmits a mute signal output by the CPU 220 to an external location, i.e., to the motherboard of the computer 100. Thus, the computer 100 can accurately identify the muted state of the drive 200, and accordingly, can precisely disable the sound functions (e.g., the audio amplifier and the mixer of the audio controller 37) and set them in the power saving state. For the details of the structure and the operational characteristics of the computer system that receives a mute signal from the external storage device, see the specifications for Japanese Patent Application No. Hei 9-192801 (Our Docket No.: JA9-97-118) and Japanese Patent Application No. Hei 9-230972 (Our Docket No.: JA9-97-140).

Figure 3:
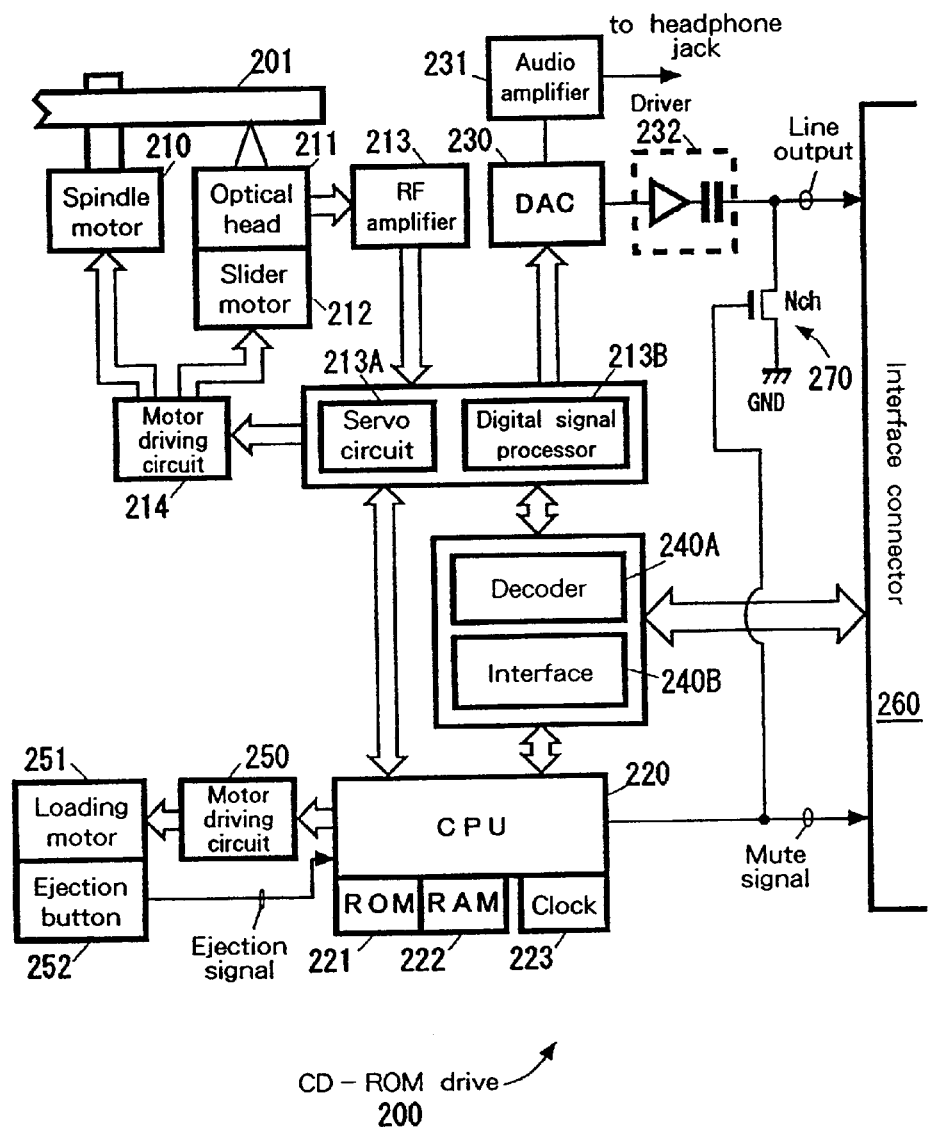
FIG. 3 is a diagram illustrating the internal hardware arrangement of a CD-ROM drive 200 (second embodiment).

FIG. 3 is a diagram illustrating the internal hardware arrangement of a CD-ROM drive 200 (second embodiment). The same reference numerals as are used in the first embodiment in FIG. 2 are also used to denote corresponding or identical components.

In the second embodiment, the structure and the operational characteristic of the drive unit 200, such as the structure and the operation for retrieving data from a disk 201 in response to a host command, the interface with the computer 100 and a mechanism for insertion/removal a disk 201, are substantially the same as those in the first embodiment.

A distinctive difference between the second embodiment and the first embodiment is a mechanism for attenuating the line output of an audio signal when the drive unit 200 is in the muted state. This difference is implemented by providing an N channel FET switch 270 used for grounding the output line of the driver 232.

The FET switch 270 receives at its gate a mute signal (previously described) from the CPU 220. Therefore, during a period other than the retrieval of the audio data, i.e., during the muted state, a high voltage is applied to the gate, and accordingly, the output of the driver 232 goes to the ground level. Thus, an unwanted signal is not input to the computer 100 (the audio controller 37 on the motherboard) and the generation of noise can be prevented.

Figure 4:
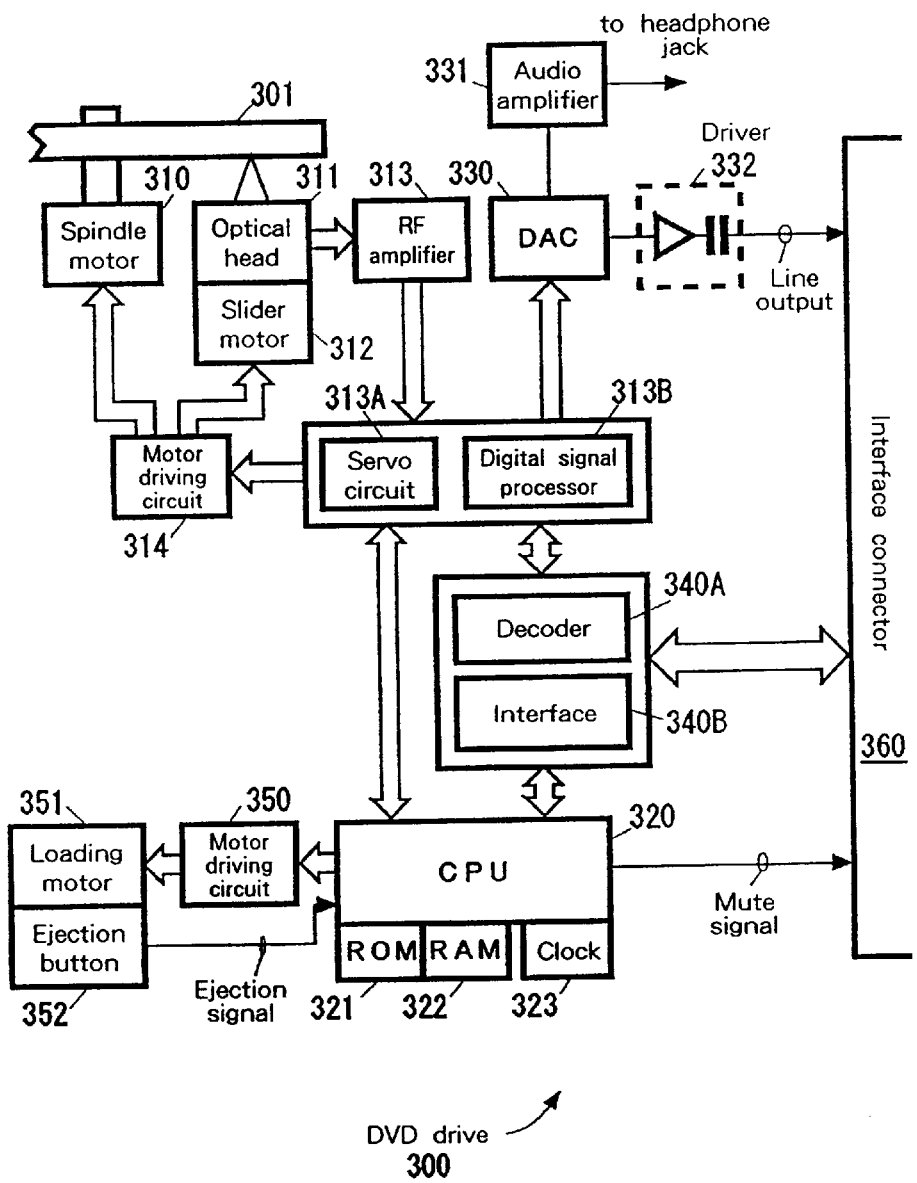
FIG. 4 is a diagram illustrating the internal hardware arrangement of a DVD drive 300 (third embodiment).

Another example of the external storage device is a DVD (Digital Video Disc) drive. The DVD drive may be either an IDE DVD drive that is so connected as to be exchangeable with the IDE CD-ROM drive 26 shown in FIG. 1, or a SCSI DVD drive connected through a SCSI card. FIG. 4 is a diagram illustrating the internal hardware arrangement of a DVD drive 300 (a third embodiment). The individual sections will now be described.

A DVD (Digital Video Disc or Digital Versatile Disc) 301 is rotatably loaded on a spindle motor 310. The DVD 301 is a storage medium on which data are stored by forming digital data bits (convex and concave shapes having different reflection indexes) on one side of a disk made of transparent resin. Data are recorded on the disk 301 radially and with an equal density from the center to the external circumference, i.e., bits are formed. A drive 300 scans tracks on the disk 301 using a laser beam, and employs changes in the intensity of the reflection for the retrieval of data, which will be described later. The DVD disk 301 has the same data storage format as does the CD, except that it has a narrower bit width (therefore, a larger memory capacity is available in each unit area), and complete compatibility with the CD-ROM is ensured.

A tray (not shown) on which the disk 301 is exchangeably inserted is so coupled with a loading motor 351 as to permit insertion and ejection of the disk 301. An ejection button 352 is a control button that is generally provided on the front bezel of the DVD drive 300 to instruct the insertion/ejection operation of the tray. When the depression of the button 352 is detected, the event is transmitted to a CPU 320 (to be described later) through an ejection signal line. In response to an instruction from the CPU 320, a motor driver 350 drives the loading motor 351.

An optical head (Pick-Up-Head) 311 is provided beneath the bottom surface of the disk 301. The optical head 311 irradiates the disk 301 with a laser beam and collects the reflection. In order to access each layer on the disk 301, the optical head 311 is either a twin head type or a variable focus type.

The optical head 311 is mounted on a slider motor 312 that can be moved in the radial direction of the disk 301. A motor driving circuit 314 controls the revolutions of the spindle motor 310 and the sliding motor 312, so that the optical head 311 scans the tracks of the disk 301 at a constant linear velocity (CLV).

A signal from the optical head 311 is transmitted to an RF amplifier 313 for controlling the position of the optical head 311 and for the retrieval of data stored on the disk 301. A closed loop control system, which is formed by a servo circuit 313A and the motor driving circuit 314, synchronously drives the spindle motor 310 and the slider motor 312 in accordance with the signal output by the optical head 311, and enables the optical head 311 to scan a predetermined location on the disk 301. The optical head 311 is supported by a dual-axes device (not shown) that can be moved slightly, and that can compensate for focusing and tracking.

The signal from the optical head 311 is processed by a digital signal processor 313B for the retrieval of data. The digital signal processor 313B also performs a descramble process. In this embodiment, the digital signal processor 313B and the servo circuit 313A are constructed on the same chip.

The CPU 320, which will be described later, determines whether or not a retrieved signal is audio data or computer data. This determination process may be performed by determining whether or not demodulated binary data can be interpreted as computer data. The determination process can be implemented by the execution by the CPU 320 of firmware stored in a ROM 321, which will be described later.

When data retrieved from the disk 301 are audio data, a digital audio signal is converted into an analog signal by a digital/analog converter (DAC) 330. The level of the analog audio signal output by the DAC 330 is converted by a driver 332, and the resultant analog signal is output to the computer 100 (the audio controller 37 on the motherboard) across a line through an interface connector 360, or is amplified by an audio amplifier 331 in the drive unit 300 and the resultant signal is externally output through a headphone jack.

If audio data are retrieved from the disk 301, a mute signal at a low level is transmitted by the CPU 320 through the interface connector 360 in order to notify the computer 100 of the "unmuted" state of the drive 300.

When data retrieved from the disk 301 are computer data, they are decoded by a decoder 340A and the decoded data are transmitted to the computer 100 by an interface 340B. The interface 340B includes I/O registers, including a data register, an address register, a control register and a status register, and is interconnected with the bus 16/18 on the motherboard through the interface connector 360. The protocol for interfacing with the bus 16/18 may conform to IDE, SCSI or other standards. In other words, there is no limitation placed on the interfaces used to embody the present invention. In this embodiment, the decoder 340A and the interface 340B are constructed on the same chip.

When the data retrieved from the disk 301 are computer data, the CPU 320 transmits a high level mute signal through the interface connector 360 in order to notify the computer 100 of the "muted" state.

The CPU 320 is a main controller for controlling the internal operation of the DVD drive 300. More specifically, the CPU 320 employs a signal from the ejection button 352 to insert or eject the tray. In addition, the CPU 320 receives a host command from the computer 100 through the interface 340B, and retrieves data from (or writes data to) the disk 301. While the CPU 320 also performs mutual authentication processes for the loaded disk 301, this function is not directly related to the subject of the present invention and no explanation for it will be given.

A ROM 321, a RAM 322 and a clock 323 are provided for the CPU 320. In the ROM 321 are permanently stored firmware to implement operations, such as a self diagnosis at power-on reset, interpretation of a host command, confirmation of the status in the drive 300, mechanical control and mutual authentication. The RAM 322 is a volatile memory for storing work data used by the CPU 320, and also for storing the drive parameters (a data transfer speed, etc.) and audio parameters (a sound output level, etc.). The clock 323 is a device for generating a sync signal to acquire the operational timing.

The DVD drive 300 transmits a mute signal to an external location, i.e., to the motherboard of the computer 100. Thus, the computer 100 can accurately identify the muted state of the drive 300, and accordingly, can precisely disable the sound functions (e.g., the audio amplifier and the mixer of the audio controller 37) and set them in the power saving state. For the details of the structure and the operational characteristics of the computer system that receives a mute signal from the external storage device, see the specifications for Japanese Patent Application No. Hei 9-192801 (Our Docket No.: JA9-97-118) and Japanese Patent Application No. Hei 9-230972 (Our Docket No.: JA9-97-140).

As in the second embodiment which is pertinent to the first embodiment, the process where the output of audio signal from the drive is disabled during the mute period can be performed for the DVD drive in the third embodiment.

Figure 5:
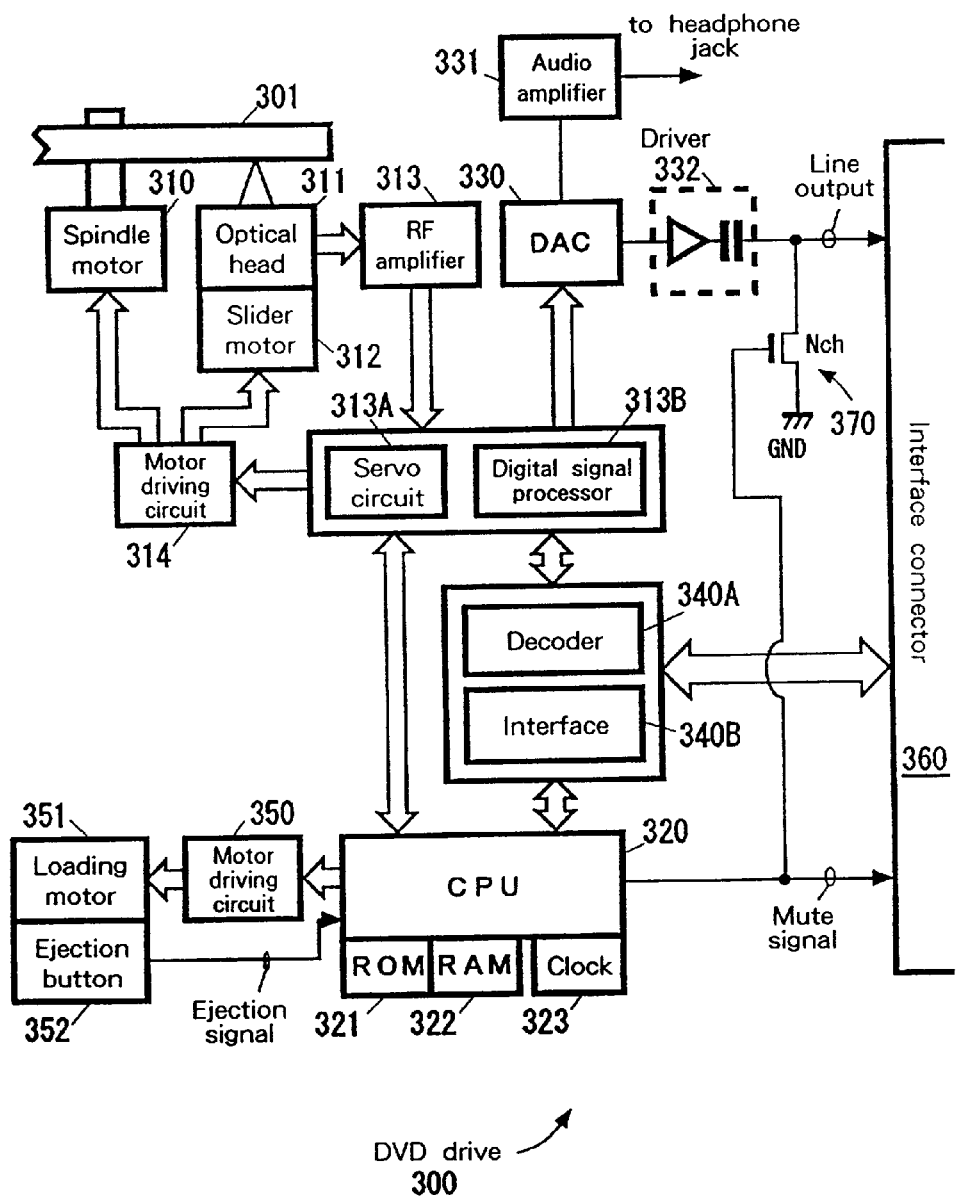
FIG. 5 is a diagram illustrating the internal hardware arrangement of a DVD drive 300 (fourth embodiment).

FIG. 5 is a diagram illustrating a fourth embodiment of the present invention.

As is shown in FIG. 5, an N channel FET switch 370 is provided for grounding the output line from a driver 332.

The FET switch 370 receives at its gate a mute signal (previously described) from the CPU 320. Therefore, during a period other than the retrieval of the audio data, i.e., during the mute period, a high voltage is applied to the gate, and accordingly, the output of the driver 332 goes to the ground level. Thus, an unwanted signal is not input to the computer 100 (the audio controller 37 on the motherboard) and the generation of noise can be prevented.

C. Input of an audio signal and a mute signal to a computer 100.

The external storage device in the second and the fourth embodiment attenuates the line output of an audio signal when it is in the muted state. This is done to prevent the generation of noise in the computer 100 that receives the line output. This effect can be provided by adding a mechanism for grounding an audio signal line in response to the receipt of the mute signal, is shown in FIGS. 3 and 5.

However, since generally there is a distance between the external storage device, such as a CD-ROM drive or a DVD drive, and the audio controller 37 on the motherboard of the computer, the ground level may differ between the drive and the motherboard.

Figure 6:
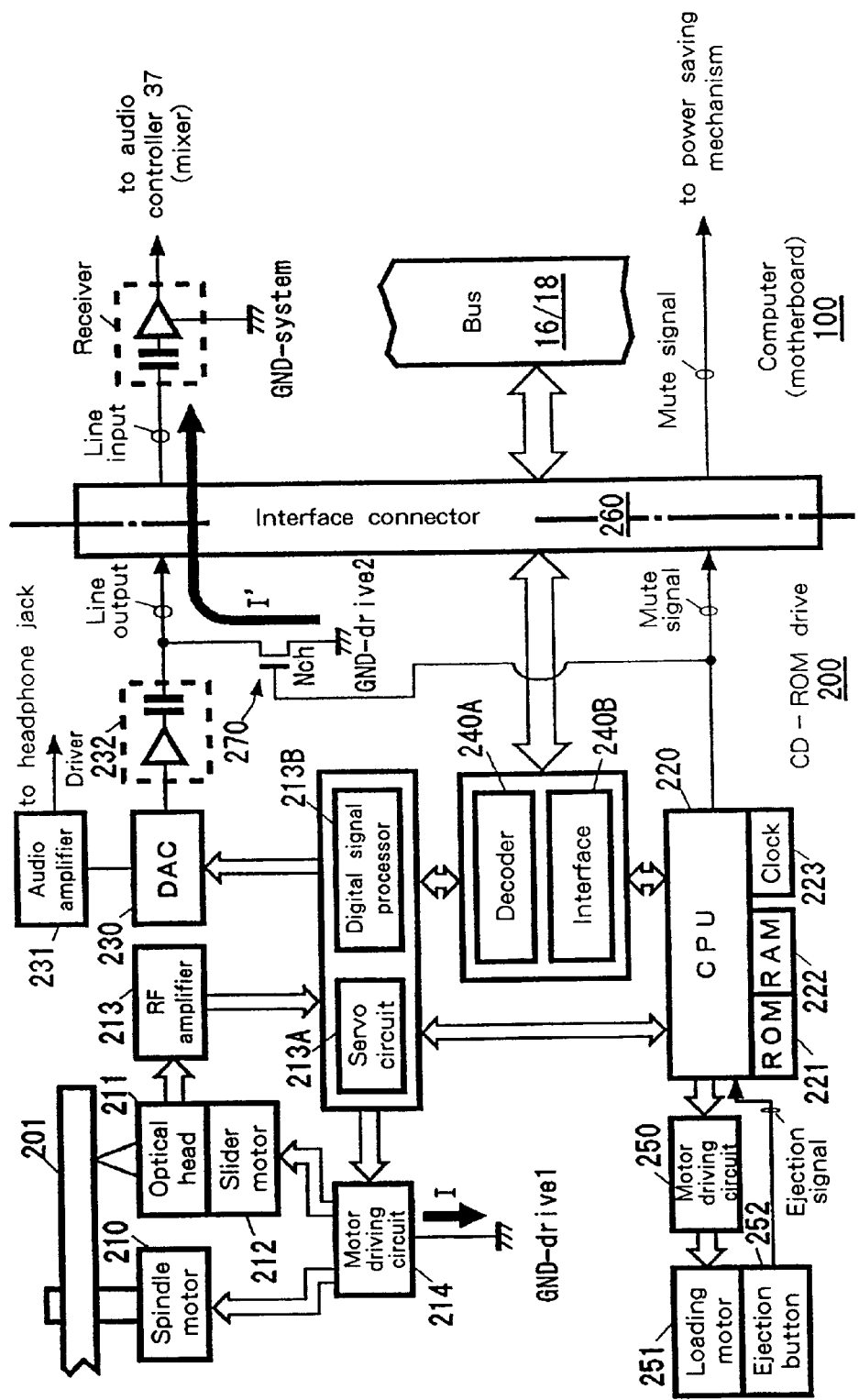
FIG. 6 is a diagram illustrating a condition where noise is produced in the second embodiment.

FIG. 6 is a diagram illustrating the condition when noise is generated in the CD-ROM drive 200 in the second embodiment. When the spindle motor 210/310 is rotating, an inlet current to $GND_{drive-1}$ occurs in the motor driving circuit 214/314. Accordingly, an outlet current I', to offset the inlet current I, is generated at $GND_{drive-2}$, for example. Since the $GND_{drive}$ level in the drive unit 200 differs from the $GND_{system}$ level in the computer 100, the outlet current I' will flow to the computer 100 through the interface connector while the FET switch 270 is ON state (i.e., the audio line output was disabled upon the muted state), and is supplied to the audio controller 37, thereby generating the noise.

When the external storage device is removed from the media bay, the line input terminal of the computer is in the open state. That is, noise may be generated by a floating capacity at the end of the input line.

Figure 7:
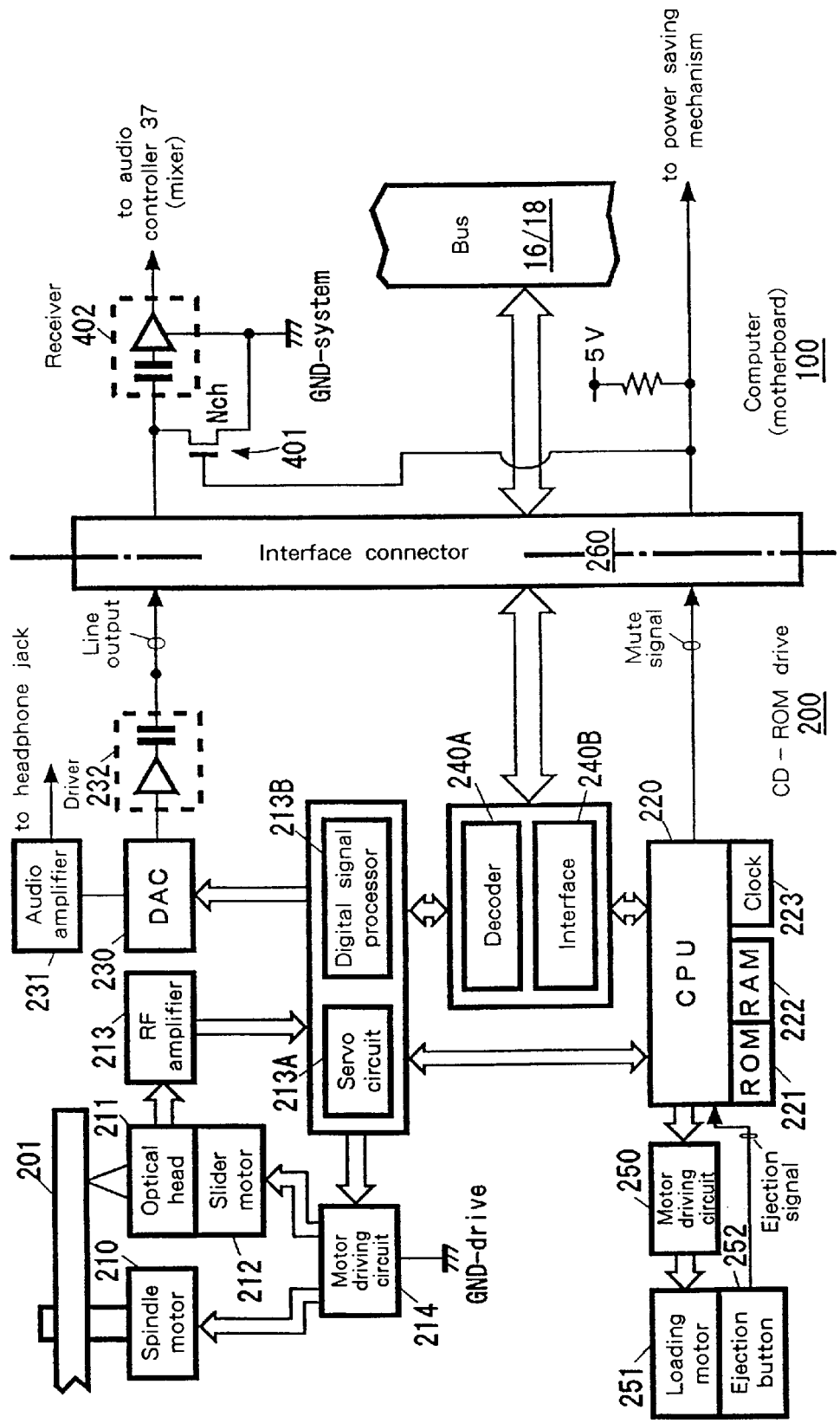
FIG. 7 is a diagram illustrating the interface of a computer 100 with an external storage device and its adjacent vicinity according to a fifth embodiment.

A computer 100 according to a fifth embodiment of the present invention resolves the above shortcoming. FIG. 7 is a diagram showing an interface of the computer 100 with an external storage device and its adjacent vicinity. The structure of an external storage device 200 is substantially the same as the above described structure, and no further explanation for it will be given.

An N channel FET switch 401 is provided as a noise removal mechanism for the computer 100 (on the motherboard). The source and the drain of the FET switch 401 lead a input line signal for a receiver 402 to the ground ($GND_{drive-1}$). A mute signal input by the drive unit 200 is received at the gate of the FET switch 401. The mute signal may be pulled up by a power voltage (e.g., 5 V) in the computer 100.

When the drive unit 200 is replaying music CD data (i.e., is in the unmuted state), the retrieved audio signals are transmitted unchanged to the audio controller 37 through the interface connector 260. When the drive unit 200 is retrieving computer data (i.e., is in the muted state), a high-level mute signal is transmitted by the CPU 220. In response to this, the FET switch 401 is turned on and grounds the input signal line. As a result, no signal is input to the audio controller 37 and the source of noise is cut off. In this embodiment, it should be fully understood that no influence is exerted by a difference between the $GND_{drive}$ level of the drive unit 200 and the $GND_{system}$ level of the computer 100.

Even when the drive unit 200 is removed and the line input terminal of the computer 100 is in the floating state, an input signal line is disconnected from the input line terminal, and does not become a noise source.

The FET switch 270 may not always be provided as the noise removal mechanism in the drive unit 200, and although in this embodiment, an explanation has been given for an example wherein the noise removal mechanism is applied for a CD-ROM drive 200, but such a mechanism can be applied in the same manner for a DVD drive 300.

D. Appendix

The present invention has been described in detail while referring to a specific embodiment. However, it should be obvious to one having ordinary skill in the art that various modifications or revisions of the embodiment are possible within the scope of the present invention.

In this embodiment, an explanation was given for a PC, in which an external storage device is installed, based on a so-called PC/AT compatible machine ("PC/AT" is a trademark of IBM Corp.) that conforms to the OADG specifications. However, the present invention can be accomplished in the same way by using another type of system (e.g., a system represented by the NEC PC 98 series or the Macintosh of Apple Computer Inc., or another machine compatible with either of these computers). A CD-ROM drive and a DVD drive have been employed as an external storage device having an audio function. However, it would be obvious for one having ordinary skill in the art that the present invention can be applied for a peripheral device that handles another storage medium, so long as it has an audio function.

That is, although the present invention has been disclosed by using specific examples, it should not be limited to them. To fully understand the subject of the present invention, the claims should be referred to.

As is described above in detail, according to the present invention, provided is a superior external storage device that can inform an external apparatus of its muted state, and a superior information processing apparatus that can be connected to such an external device.

According to the present invention, provided is a superior information processing apparatus that improves a S/N ratio in the muted state by employing a mute signal received from an external storage device that produces an audio signal.

We claim:

1. An external storage device having an audio function and being mounted in an information processing apparatus, comprising:

a data retrieval unit for retrieving data from an internally loaded storage medium;

a signal processor for processing the retrieved data;

a determination unit for determining whether or not the retrieved data are audio data or computer data;

an audio signal output unit for performing a DA conversion of the processed signal and outputting the resultant signal if the retrieved data are audio data;

a computer signal output unit for decoding the processed signal and outputting the resultant signal if the retrieved data are computer data;

an interface for connecting said computer signal output unit to said information processing apparatus; and a muted state notification unit for informing said information processing apparatus that retrieved data are mute data upon a determination that the retrieved data are not audio data.

2. The external storage device according to claim 1, wherein said external storage device being a CD-ROM drive that can retrieve data from either a CD-DA (Digital Audio) disk or a CD-ROM disk.

3. The external storage device according to claim 1, wherein said external storage device being a DVD drive that can access a DVD (Digital Versatile Disc).

4. An external storage device having an audio function and being mounted in an information processing apparatus, comprising:

a data retrieval unit for retrieving data from an internally loaded storage medium;

a signal processor for processing the retrieved data;

a determination unit for determining whether or not the retrieved data are audio data or computer data;

an audio signal output unit for performing a DA conversion of the processed signal and outputting the resultant signal if the retrieved data are audio data;

a computer signal output unit for decoding the processed signal and outputting the resultant signal if the retrieved data are computer data;

an interface for connecting said computer signal output unit to said information processing apparatus;

a muted state notification unit for informing said information processing apparatus that retrieved data are mute data upon a determination that the retrieved data are not audio data; and an output attenuator for attenuating the output of said audio signal output unit in response to said muted state.

5. An external storage device having an audio function and being mounted in an information processing apparatus that can retrieve data from either an audio data disk or a computer data disk, comprising:

a data retrieval unit for retrieving data from an internally loaded disk;

a determination unit for determining whether said loaded disk is an audio data disk or a computer data disk;

an audio data processor for processing retrieved audio data;

a D/A converter for performing a D/A conversion of the processed audio data;

a line output driver for outputting through a line obtained analog audio data;

a computer data processor for processing retrieved computer data;

a decoder for decoding the processed computer data;

an interface for exchanging the decoded computer data with said information processing apparatus; and a mute signal transmitter for transmitting a mute signal to said information processing apparatus upon a determination that an audio data disk is not loaded.

6. An external storage device having an audio function and being mounted in an information processing apparatus that can retrieve data from either an audio data disk or a computer data disk, comprising:

a data retrieval unit for retrieving data from an internally loaded disk;

a determination unit for determining whether said loaded disk is an audio data disk or a computer data disk;

an audio data processor for processing retrieved audio data;

a D/A converter for performing a D/A conversion of the processed audio data;

a line output driver for outputting through a line obtained analog audio data;

a computer data processor for processing retrieved computer data;

a decoder for decoding the processed computer data;

an interface for exchanging the decoded computer data with said information processing apparatus;

a mute signal transmitter for transmitting a mute signal to said information processing apparatus upon a determination that an audio data disk is not loaded; and a line output attenuator for attenuating the line output of said line output driver upon a determination that an audio data disk is not loaded.

7. An information processing apparatus, in which an external storage device having an audio function can be installed, comprising:

an interface connector used for an electric connection to said external storage device;

a bus signal line, for computer data exchange, being connected to said external storage device through said interface connector;

an audio signal line along which an audio signal is received from said external storage device through said interface connector; and a mute signal line along which a mute signal is received from said external storage device through said interface connector.

8. The information processing apparatus according to claim 7, wherein said external storage device being a CD-ROM drive that can retrieve data from either a CD-DA (Digital Audio) disk or a CD-ROM disk.

9. The information processing apparatus according to claim 7, wherein said external storage device being a DVD drive that can access a DVD (Digital Versatile Disc).

10. An information processing apparatus, in which an external storage device having an audio function can be installed, comprising:

an interface connector used for an electric connection to said external storage device;

a bus signal line, for computer data exchange, being connected to said external storage device through said interface connector;

an audio signal line along which an audio signal is received from said external storage device through said interface connector;

a mute signal line along which a mute signal is received from said external storage device through said interface connector; and a device for attenuating said received audio signal in response to a muted state of said mute signal line.

11. An information processing apparatus, in which an external storage device having an audio function can be installed, comprising:

a CPU for totally controlling the entire apparatus;

a memory used to temporarily store data and a program to be executed by said CPU;

a bus for interconnecting individual units in said apparatus;

a bus interface for interconnecting said external storage device with said bus;

an audio signal line along which an audio signal is received from said external storage device;

a sound function unit for outputting said audio signal received along said audio signal line; and a mute signal line along which a mute signal is received from said external storage device.

12. An information processing apparatus, in which an external storage device having an audio function can be installed, comprising:

a CPU for totally controlling the entire apparatus;

a memory used to temporarily store data and a program to be executed by said CPU;

a bus for interconnecting individual units in said apparatus;

a bus interface for interconnecting said external storage device with said bus;

an audio signal line along which an audio signal is received from said external storage device;

a sound function unit for outputting said audio signal received along said audio signal line;

a mute signal line along which a mute signal is received from said external storage device; and a power saving controller for, at least while said mute signal line is in an unmuted state, keeping said sound function unit in an enabled state.

13. An information processing apparatus, in which an external storage device having an audio function can be installed, comprising:

a CPU for totally controlling the entire apparatus;

a memory used to temporarily store data and a program to be executed by said CPU;

a bus for interconnecting individual units in said apparatus;

a bus interface for interconnecting said external storage device with said bus;

an audio signal line along which an audio signal is received from said external storage device;

a sound function unit for outputting said audio signal received along said audio signal line;

a mute signal line along which a mute signal is received from said external storage device; and a device for attenuating said received audio signal in response to a muted state of said mute signal line.

* * * * *